United States Patent [19]

Corbellini et al.

[11] 4,297,462
[45] Oct. 27, 1981

[54] POLYMERIZATION OF MONOOLEFINS USING AN ALUMINUM-TITANIUM CATALYST SYSTEM

[75] Inventors: Margherita Corbellini, Milan; Alberto Greco, Dresano; Mirko Osellame, Ombriano, all of Italy

[73] Assignees: Snamprogetti S.p.A, Milan; Anic S.p.A, Palermo, both of Italy

[21] Appl. No.: 78,899

[22] Filed: Sep. 25, 1979

Related U.S. Application Data

[62] Division of Ser. No. 915,998, Jun. 16, 1978, Pat. No. 4,203,866.

[30] Foreign Application Priority Data

Jun. 30, 1977 [IT] Italy ............................ 25232 A/77

[51] Int. Cl.³ ............................................. C08F 4/64
[52] U.S. Cl. .................................... 526/125; 526/114; 526/115; 526/116; 526/117; 526/119; 526/121; 526/122; 526/124; 526/348; 526/352; 526/907
[58] Field of Search ............... 526/114, 115, 116, 117, 526/119, 121, 124, 125, 907, 122

[56] References Cited

U.S. PATENT DOCUMENTS

| | | | |
|---|---|---|---|
| 3,094,568 | 6/1963 | Hay et al. | 252/429 B X |
| 3,316,314 | 4/1967 | van den Berg | 252/429 C X |
| 3,365,434 | 1/1968 | Coover et al. | 252/429 B X |
| 3,432,513 | 3/1969 | Miller et al. | 252/429 B X |
| 3,769,373 | 10/1973 | Reed et al. | 252/429 C X |
| 4,194,992 | 3/1980 | Corbellini et al. | 526/116 |

OTHER PUBLICATIONS

Timms, "Synthetic Reactions of Metal Atoms at Temperatures of 10° to 273° K.," Angewandte Chemie, 14, No. 5, pp. 273–277, May, 1975.

*Primary Examiner*—Stanford M. Levin
*Attorney, Agent, or Firm*—Morgan, Finnegan, Pine, Foley & Lee

[57] ABSTRACT

For the polymerization of ethylene, as such or with one or more alpha-olefines, a novel catalyst composition is suggested, which has a high yield of polymer per weight unit of catalyst. Such compositions are prepared from a titanium compound in which the valency of Ti is 3 or more, said compound being reacted with the vapors of one or more metals of the group consisting of Al, Cr, Mn, V, Ti, Zr, Mo, Zn and Ca in the presence of a halogen donor which is preferably an organic halide, certain inorganic halides being capable of being used provided that the halide metal has at least two degrees of valency. The composition is used in association with an aluminium hydrocarbyl halide. Yields as high as 30,000 grams of polymer per gram of elemental Ti can be obtained.

14 Claims, No Drawings

POLYMERIZATION OF MONOOLEFINS USING AN ALUMINUM-TITANIUM CATALYST SYSTEM

CROSS-REFERENCE TO RELATED APPLICATION

This application is a division of application Ser. No. 915,998, filed June 16, 1978 (now U.S. Pat. No. 4,203,866, issued May 20, 1980).

This invention relates to novel chemical compositions based on a titanium trihalide and a halide of a second metal, which can be titanium itself, obtained starting from (1) a compound of titanium with a valency equal to or higher than three, which is reacted with (2) the vapors of the second metal in the presence of (3) a compound capable of furnishing halogen atoms (a halogen donor).

In the U.S. patent application Ser. No. 763,077, abandoned, a method has been described for the preparation of particular titanium trichlorides, modified by the presence of a chloride of a second metal, selected from the group consisting of Mg, Al, Ti, V, Cr, Mn and Fe, characterized by a ratio of the titanium to the second metal, corresponding to the following formula $$nTiCl_3 \cdot MCl_n \qquad (1)$$

wherein M is one of the metal enumerated above and n is its valency.

According to the above mentioned application the titanium trichlorides and, likewise those of vanadium, were obtained by reacting the tetrachloride with the vapors of the metal M. According to the teachings mentioned above, it is possible to prepare formulations based on titanium trichloride and magnesium dichloride in which, however, the ratio Mg to Ti is higher than in the formula (1) reported above: as a matter of fact there is always such an excess of magnesium that the molar ratio of Mg to Ti is higher than 1:2.

It has now been found, and this is a first subject matter of the present invention, that it is possible to prepare compositions based on titanium trihalide and halides of one or more metals in which the molar ratio of the latter metals to titanium is higher than 1:n, wherein n is the numerical value of the valency of the metal which is present and corresponds to the higher value in the case of the simultaneous presence of more metals having different valencies.

Also in this case, compositions can be obtained, which are considerably enriched with halides different from titanium trihalide, as compared with the compositions which could be obtained according to the above mentioned patent application. The ratio M to Ti, as a matter of fact, can attain as high values as 200 and over.

The compositions referred to above are prepared by a method which provides for the vaporization in a vacuum of the metal(s) enumerated under (2) above and the reaction of the vapors thus obtained with the titanium compound in the presence of a halogen donor compound. The vaporization of the metal is carried out under absolute pressure comprised between 1 and $10^{-6}$ Torr and at a temperature varying generally within the range from 300° C. to 2500° C. according to the metal concerned. The reaction of the vapors thus obtained and the titanium compound in the presence of the halogen donor can take place both in the gaseous phase and in the liquid phase, at a temperature which, consistently with the procedure which has been selected and with the particular reagents which are employed, is selected within the range of from −150° C. to +100° C. According to a preferred procedure of the present invention, the reaction is carried out in the liquid phase in the presence of an organic diluent, in which latter the titanium compound and the halogen donor are either dissolved or slurried prior to their being contacted with the metal vapors, at a temperature below the boiling point temperature of the individual components which are contained in the liquid phase under the conditions of pressure which are adopted, said temperature being for example from −70° C. to +20° C.

As halogen donors, organic halides can be used, especially those having the general formula

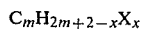

$$C_mH_{2m+2-x}X_x$$

wherein X is Cl or Br, m is a number comprised between 1 and 18, and x is a number variable from 1 to 4, and in this case, they can be the diluent medium referred to above. As an alternative, inorganic halides of high-valency elements can be used, but those which are capable of existing in two oxidation states, such as $SnCl_4$, $SbCl_5$, $POCl_3$, $VCl_4$. As regards the titanium compound, the latter can be selected from a wide variety of products such as, for example, titanium trihalides and tetrahalides, titanium tetraalcoholates and halogen alcoholates, titanium tetrabenzyl and halogen benzyl derivatives, titanium tetraallyl and halogen allyls, titanium amides and amidohalides, titanium chelates and many others. The metal intended to be vaporized is preferably selected from among Al, Cr, Mn, Fe, V, Ti, Zr, Mo, Zn and Ca.

As outlined above, it is preferred that such a reaction be conducted in the presence of an organic diluent, which is selected from among the aliphatic and aromatic hydrocarbons, or their mixtures: in the case of organic halogen-donors, these latter, as themselves, can be the diluents.

When carrying the method outlined above into practice, it has been found that the by-products of the reactions carried out with an inorganic halide can remain occluded in the compositions themselves: this fact, however, is not conducive to any noteworthy alterations and the features and the properties of such compositions remain virtually unaltered over those which can be seen when these foreign occlusions, formed by halides of the metals at a low valency state, and which have donated the halogens, are not present.

The compositions based on titanium trichloride, the subject matter of this invention, can be exploited for a number of profitable uses. Their employment has proven to be especially efficient, and this is a second aspect of the present invention, as the components of catalyst systems in the polymerization of unsaturated compounds.

As a matter of fact, it has been ascertained that it is possible to prepare polymers or copolymers of olefines, and preferably of ethylene, by having the polymerization reaction carried out in the presence of a system composed by a derivative of aluminum having the formula $AlR_pX_{3-p}$, wherein R is a hydrocarbonaceous radical, X is a halogen and p is a number of from 1 to 3, and by a composition based on titanium trihalide as defined hereinbefore.

Such a composition can directly be employed in the polymerization run, just as it has been obtained with the method of preparation described above without any preliminary filtration or separation stage. The polymerization step, in its turn, is effected in the presence of a hydrocarbonaceous solvent which, as it is obvious, can be the same diluent as used for the preparation of the titanium derivative, at a temperature in the range of from 20° C. to 200° C. and under pressures which can be varied from 1 to 60 atm.

In the case of ethylene, moreover, the results are actually worth to be noted since very high polymer yields are obtained, which are over 10,000 grams of polymer per gram of titanium, as referred to one hour and to one atmosphere of ethylene.

The polymers which can thus be produced are highly linear and thus they have a high density and a high crystallinity and do not require any washing stage for removing the catalyst residues.

EXAMPLE 1

The preparation is carried out in a rotary flask in the center of which a spiralled tungsten filament is arranged, which is immersed in alumina, the latter acting also as a crucible, the filament being connected to a source of electric power. Under the flask and in a horizontal posture, a cold bath is arranged. In the top fixed section of the apparatus, there are nitrogen and vacuum inlets. The crucible is charged with 0.7. grams (12.5 mM) of chemically pure manganese in granulated form. In the 500 ml flask are charged under a nitrogen stream 150 mls of pure petroleum (b.p. 165° C.–235° C.), 0.4 mls of $TiCl_4$ (3.6 mM) and 10 mls of 1 chlorohexane (72 mM). The flask is cooled to $-50°$ C. and is set to rotation, vacuum is applied at $2.10^{-3}$ mmHg and the spiral is heated so as to vaporize the metal. A dark brown precipitate is formed. On completion of the vaporization stage, taking about 2 hrs., nitrogen is introduced into the apparatus and the product is allowed to recover at room temperature and subsequently is placed at 100° C. for 5 hrs. The analysis of the suspension gives $TiMn_3Cl_9$.

Polymerization

A 5 liter autoclave fitted with an anchor-shaped stirrer is charged with 2 liters of nor.heptane which has been deaerated, 4 mM of Al (isobutyl)$_3$ and a quantity of catalyst, prepared according to the procedure reported hereabove, equal to 0.04 milligramatoms of elemental titanium. The temperature is raised to 85° C., whereafter there are charged 2 kilograms/sq. centimeter of hydrogen and 2.5 Kg/sq. cm. of ethylene. Ethylene is continuously fed so as to keep the total pressure constant during one hour. There are obtained 125 grams of a polymer having a melt flow index under a load of 2.16 kg (MFI, ASTM D 1236-65T) of 0.31 grams/10 mins. and a density (d) equal to 0.972 g/cu.cm. The specific activity is 26,000 grams of polymer per gram of Ti, per hour of reaction and per atm of ethylene (g Ti.h.atm. $C_2^-$).

EXAMPLE 2

The same apparatus and the same procedure as in Example 1 are adopted by using as the halogen donor tin tetrachloride. The amounts of reagents which are used are: petroleum 180 mls, Mn 600 milligrams (11.2 mM), $TiCl_4$ 0.062 mls (0.56 mM), $SnCl_4$ 1.33 mls (11.2 mM). A brown slurry is obtained, which is heated to 95° C.–100° C. for 2 hours. The suspension discharges its color until becoming nearly white, is collected on a filter, washed with nor.octane to remove the excess tin tetrachloride, whereafter the analysis is effected, which gives: $TiMn_{24}Sn_{24}Cl_{100}$. By employing this composition in the polymerization of ethylene, under the conditions of Example 1, a specific activity of 19,000 grams of polymer per gram of Ti, per hour and per atm of ethylene has been experienced and the polymer had an MFI of 0.6 grams/10 mins and a d of 0.971 g/cu.cm (see Example 1).

EXAMPLE 3

The same apparatus and the same procedure as in Example 1 are used, the halogen donor being now 1-chlorohexane.

The quantities of reagents which are used are: nor.octane 100 mls, Mn=650 milligrams (11.8 mM), $TiCl_4$ 0.1 ml (0.9 mM) $C_6H_{13}Cl$ 10 mls (73 mM).

A brown suspension is obtained, which is heated to 95° C.–100° C. for 2 hours, with stirring. The analysis of the suspension gives: $TiMn_6Cl_{15}$. The use of such a composition in the polymerization of ethylene, under the conditions of Example 1, gives a specific activity of 28,000 of polymer per gram of Ti, per hour and for atm of ethylene, the polymer having an MFI of 1.21 grams/10 mins and a density of 0.970 grams/cu.cm.

EXAMPLE 4

The copolymerization of ethylene and propylene is carried into effect by using the catalyst disclosed in Example 1, with the same procedure, the same conditions of polymerization and the same concentrations of catalyst and co-catalyst as disclosed in that Example.

The propylene feed is carried out concurrently with that of ethylene, by feeding in a quantity of propylene equal to 3% of that of ethylene, the gases being metered with calibrated flow-meters. After a 2-hour polymerization, there are obtained 200 grams of a polymer having an MFI of 0.33 grams/10 mins and a density of 0.9539, that which is equivalent to a specific activity of 21,000 grams of polymer per gram of Ti, per hour and per atm of $C_2^-$.

EXAMPLE 5

The same apparatus and the same procedure as in Example 1 are adopted and the reagents are $TiCl_4$, nor.$C_6H_{13}Cl$, metallic Zn and nor.octane as the diluent, in the following amounts: Zn 1.5 grams (23 mM) $TiCl_4$ 0.1 ml (0.91 mM), nor.$C_6H_{13}Cl$ 7.1 mls (51.6 mM), nor.octane 230 mls. Not all the Zn is vaporized. The suspension is allowed to recover at room temperature and then heated to 100° C. for 3 hrs. The analysis of the suspension gives: $TiZn_{9.5}Cl_{21}$.

EXAMPLE 6

The same apparatus and the same procedure as in Example 1 are adopted, the reagents being the following: Cr 0.77 grams (14.8 mM), $TiCl_4$ 0.20 ml (1.81 mM), $SnCl_4$ 1.8 ml (15.4 mM) petroleum 90 mls.

The suspension which is obtained is heated to 100° C. during 2 hrs. and then collected on a filter: the solids are washed with nor.heptane (anhydrous) and deaerated three times, then reslurried in nor.heptane. The analysis of the slurry has shown the formula: $TiCr_{1.5}Cl_{7.5}$.

EXAMPLE 7

The same apparatus and the same procedure as in Example 1 are used, and the following reagents are employed: Mn 1.05 grams (19.15 mM), $TiCl_4$ 1.71 ml (15.5 mM), VCl$_4$ 1.65 ml (15.5 mM), nor.heptane 100 mls.

The metal is vaporized to the extent of 80%. The suspension is then allowed to recover at room temperature, then heated to 85° C. for 2 hrs. The suspension is collected on a filter and the solids washed with nor.heptane, then reslurried in 100 mls hexane. The suspension has the following analysis: TiMnV$_7$Cl$_{26}$. The specific activity in the polymerization of ethylene is 40,000 grams of polymer per gram of Ti, per hour, per atm of C$_2^-$. The density of the polymer is 0.970 grams/cu.cm.

EXAMPLE 8

The procedure of Example 1 is followed and the following reagents are used: Ca 0.24 grams (6 mM), TiCl$_4$ 0.66; ml (6 mM), VCl$_4$ 6 mM, nor.heptane 100 mls.

Once the vaporization of the metal is completed, a brown suspension is obtained, which is heated to 65° C. for 3 hrs: at this temperature the suspension becomes violet.

The suspension is collected on a filter, the solid residue is washed with nor.heptane and slurried in 100 mls of nor.heptane again. The analysis of the product gives the following composition: TiCaV$_8$Cl$_{29}$.

EXAMPLE 9

The same apparatus, procedure and conditions of temperature and pressure disclosed in Example 1 are adopted, the following reagents being employed: Mn 0.6 grams (11.2 mM), TiCl$_3$ type AA (3 TiCl$_3$AlCl$_3$) 0.74 grams (3.7 mM), nor.C$_6$H$_{13}$Cl 5 mls (36 mM), nor.octane 100 mls.

On completion of the vaporization of the metal, the suspension which has been obtained is allowed to recover at room temperature, whereafter it is heated to 100° C. during 10 hrs. Each operation is made under a nitrogen blanket. The analysis of the suspension gives a composition as TiMn$_3$Al$_{0.3}$Cl$_{9.3}$. The specific activity of this composition in the polymerization of ethylene is 23,000 grams of polymer per gram of Ti, per hour and per atm of C$_2^-$.

We claim:

1. A method for the polymerization or copolymerization of monoolefins which comprises contacting said monoolefin with a catalyst system composed of an aluminum derivative of the formula AlR$_p$X$_{3-p}$ in which R is a hydrocarbonaceous radical, X is a halogen radical and p is a number from 1 to 3; in combination with a composition based on a titanium halide in which said titanium has a valence of three or greater and a halide of a metal, said metal selected from zirconium, molybdenum, zinc or calcium, said composition prepared by reacting a titanium compound with the vapors of one or more of said metals in the presence of a halogen donor, and wherein the metal:titanium molar ratio is greater than 1:n, n being the valency of the metal with the greatest valency.

2. The method of claim 1 wherein said titanium compound is selected from titanium halides, titanium alcoholates, titanium amides or titanium chelates.

3. The method of claim 2 wherein said titanium compound is the titanium halide titanium tetrachloride.

4. The method of claim 2 wherein said titanium compound is the titanium halide, in complex form, TiCl$_3$AlCl$_3$.

5. The method of claim 1 wherein said vaporized metal is selected from zinc or calcium.

6. The method of claim 1 wherein said halogen donor is selected from organic halides of the formula C$_m$H$_{2m+2-x}$X$_x$ in which X is Cl or Br, m is a number from 1 to 18 and x is a number from 1 to 4; or an inorganic halide.

7. The method of claim 6 wherein said halogen donor is the organic halide 1-chlorohexane.

8. The method of claim 6 wherein said halogen donor is an inorganic halide selected from SnCl$_4$, SbCl$_5$, POCl$_3$ or VCl$_4$.

9. The method of claim 1 wherein said aluminum derivative is Al(isobutyl)$_3$.

10. The method according to claim 1 wherein the polymerization reaction is carried out in the presence of a hydrocarbonaceous solvent.

11. The method according to claim 1 wherein the polymerization reaction is carried out at a temperature from 20° C. to 200° C.

12. The method according to claim 1 wherein the polymerization reaction is carried out under a pressure between 1 and 60 atm.

13. The method according to claim 1 wherein the olefine is ethylene.

14. The method according to claim 1 wherein as the monomer to be polymerized a mixture of ethylene with one or more alphaolefines is employed.

* * * * *